US012771250B2

(12) United States Patent
Hsiao

(10) Patent No.: US 12,771,250 B2
(45) Date of Patent: Oct. 20, 2026

(54) SWITCHING CONVERTER WITH OVERSHOOT REDUCTION AND ASSOCIATED CONTROLLER

(71) Applicant: Monolithic Power Systems, Inc., Kirkland, WA (US)

(72) Inventor: Chia-Chun Hsiao, Zhubei City (TW)

(73) Assignee: Monolithic Power Systems, Inc., Kirkland, WA (US)

( * ) Notice: Subject to any disclaimer, the term of this patent is extended or adjusted under 35 U.S.C. 154(b) by 142 days.

(21) Appl. No.: 18/943,707

(22) Filed: Nov. 11, 2024

(65) Prior Publication Data

US 2026/0135484 A1 May 14, 2026

(51) Int. Cl.
*H02M 3/158* (2006.01)
*H02M 1/32* (2007.01)

(52) U.S. Cl.
CPC ............. *H02M 3/158* (2013.01); *H02M 1/32* (2013.01)

(58) Field of Classification Search
CPC ................................ H02M 3/158; H02M 1/32
See application file for complete search history.

(56) References Cited

U.S. PATENT DOCUMENTS 7,764,054 B1 * 7/2010 Guo ...................... H02M 3/156 323/283
8,896,278 B2 11/2014 Ouyang et al.
9,071,142 B2 6/2015 Yang et al.
9,270,176 B1 * 2/2016 Nguyen ................ H02M 3/156
9,270,177 B1 * 2/2016 Nakamura ............ H02M 3/156
9,306,451 B2 * 4/2016 Ouyang ................ H02M 3/156
9,318,956 B1 * 4/2016 Nakamura ............ H02M 3/158
9,356,510 B2 * 5/2016 Jiang ....................... H02M 1/14
9,479,043 B2 10/2016 Jiang et al.
9,660,534 B2 * 5/2017 Jiang ................... H02M 3/1584
9,716,432 B2 * 7/2017 Ouyang ................ H02M 3/158
10,498,241 B2 12/2019 Wu et al.
10,727,742 B2 * 7/2020 Chen ..................... H02M 3/158
11,095,221 B1 * 8/2021 Hsu ....................... H02M 3/158
11,303,204 B1 4/2022 Zhao et al.
12,040,711 B2 7/2024 Yang et al.
12,381,469 B2 * 8/2025 Alevoor ................ H02M 3/158
2009/0302820 A1 * 12/2009 Shimizu ................ H02M 3/156 323/285
2010/0283440 A1 * 11/2010 Futamura ............. H02M 3/156 323/282
2010/0315057 A1 * 12/2010 Zambetti .............. H02M 3/158 323/284

(Continued)

*Primary Examiner* — Yusef A Ahmed
(74) *Attorney, Agent, or Firm* — Ashurst Perkins Coie US LLP

(57) ABSTRACT

A controller for a switching converter has a comparison circuit, a load detect unit, a switching signal generator. The comparison circuit provides a comparison signal based on a feedback signal indicative of an output voltage. The unit detect unit determines whether a load release event is occurring in a load. The switching signal generator provides a switching control signal based on the comparison signal and the load release event. In response to the load detect unit determines that the load release event is occurring, the controller locks the switching control signal to force a high-side power switch and a low-side power switch off, and until the feedback signal is lower than a sum of a reference signal and a slope signal, the controller unlocks the switching control signal.

21 Claims, 11 Drawing Sheets

(56) References Cited

U.S. PATENT DOCUMENTS

2011/0241639 A1* 10/2011 Noda .................... H02M 3/156 323/282
2011/0304309 A1* 12/2011 Nakamura ............ H02M 3/156 323/288
2012/0032660 A1* 2/2012 Nakamura ............ H02M 3/156 323/288
2012/0032661 A1* 2/2012 Nakamura ............ H02M 3/156 323/288
2012/0043949 A1* 2/2012 Nakamura .......... H02M 3/1588 323/271
2013/0038313 A1* 2/2013 Gotoh ................... H02M 3/156 323/288
2013/0147456 A1* 6/2013 Chien ................. H02M 3/1588 323/288
2013/0257399 A1* 10/2013 Jiang .......................... G05F 1/10 323/271
2013/0314060 A1* 11/2013 Chen ..................... H02M 3/158 323/234
2014/0152277 A1* 6/2014 Nakamura ............ H02M 3/156 323/271
2015/0311798 A1* 10/2015 Yuan ..................... H02M 3/156 323/288
2018/0269787 A1* 9/2018 Chen ..................... H02M 3/156
2020/0119643 A1* 4/2020 Petracca ............... H02M 3/156
2020/0169174 A1* 5/2020 Wachi ................... H02M 1/088
2021/0067028 A1* 3/2021 Li .......................... H02M 3/158
2021/0296995 A1* 9/2021 Zhang ................... H02M 3/158
2023/0110617 A1* 4/2023 Yang ..................... H02M 3/157 323/266
2023/0198400 A1* 6/2023 Lv ........................ H02M 1/0032 323/271
2023/0299671 A1* 9/2023 Zhao ................... H02M 3/1566 323/282
2024/0022241 A1* 1/2024 Huang ............... H03K 17/6871
2024/0243734 A1* 7/2024 Liu .................... H03K 3/02335
2025/0202362 A1* 6/2025 Tsou ........................ H02M 1/38
2025/0323576 A1* 10/2025 Wachi ................... H02M 3/157

* cited by examiner

SWITCHING CONVERTER WITH OVERSHOOT REDUCTION AND ASSOCIATED CONTROLLER

BACKGROUND OF THE INVENTION

1. Field of the Invention

The present invention generally relates to electronic circuits, and more particularly but not exclusively relates to switching converters.

2. Description of Related Art

Power converters, such as DC-DC converters, are employed in power supply circuits to provide a regulated output voltage to a load. A DC-DC converter may be a buck converter that converts an input voltage to a lower output voltage, a boost converter that converts the input voltage to a higher output voltage, or a buck-boost converter that is configured to perform buck or boost conversion. A load transient condition occurs when the load current drawn by the load rapidly changes. For example, the load current may rapidly increase or decrease from steady state. Conventional voltage regulation control methods may not allow for fast response to adapt to rapidly changing load conditions, resulting in large output voltage undershoot or overshoot.

SUMMARY OF THE INVENTION

It is one of the objects of the present invention to provide a switching converter and associated controller and control method of the switching converter.

One embodiment of the present invention discloses a controller for a switching converter. The controller comprises a comparison circuit, a load detect unit, a switching signal generator, and a slope generator. The comparison circuit is configured to provide a comparison signal based on a feedback signal indicative of an output voltage of the switching converter, a reference signal and a slope signal. The load detect unit is configured to determine whether a load release event is occurring in a load of the switching converter. The switching signal generator is configured to provide a switching control signal based on the comparison signal and the load release event. The slope generator is configured to provide the slope signal. In response to the load detect unit determines that no load release event is occurring, when the feedback signal is lower than a sum of the reference signal and the slope signal, the switching control signal tranistions to a first state to turn on a high-side power switch of the switching converter and turn off a low-side power switch of the switching converter, and until an ON-time period expires, the switching control signal tranistions to a second state to turn off the high-side power switch and turn-on the low-side power switch. In response to the load detect unit determines that the load release event is occurring, the switching control signal is locked in a third state to force the high-side power switch and the low-side power switch off, such that a body diode of the low-side power switch is forced on, and until the feedback signal is lower than the sum of the reference signal and the slope signal, the switching control signal is unlocked from the third state to the first state.

Another embodiment of the present invention discloses a switching converter. The switching converter comprises an input node configured to receive an input voltage, an output node configured to provide an output voltage to a load, a switching circuit, a magnetic device, a driver, and a controller. The switching circuit comprises a high-side power switch and a low-side power switch. The high-side power switch and the low-side power switch are coupled in series between the input node and a reference ground, and a switch node is formed by the high-side power switch and the low-side power switch. The magnetic device is coupled between the switch node and the output node. The driver is configured to drive the high-side power switch and the low-side power switch based on a switching control signal. The controller is configured to provide the switching control signal based on a load release event and a feedback signal indicative of the output voltage. In response to the controller determines that the load release event is occurring, the switching control signal is locked in a tri-state to force the high-side power switch and the low-side power switch off, and until the feedback signal is lower than a sum of a reference signal and a slope signal, the switching control signal is unlocked from the tri-state to turn on the high-side power switch and turn off the low-side power switch.

Yet another embodiment of the present invention discloses a control method for a switching converter. Providing a comparison signal based on a feedback signal indicative of an output voltage of the switching converter. Determining whether a load release event is occurring in a load of the switching converter. Providing a switching control signal based on the load release event and the comparison signal. In response to that the load release event is occurring, locking the switching control signal to a tri-state to force a high-side power switch and a low-side power switch of the switching converter off, and until the feedback signal is lower than a sum of a reference signal and a slope signal, unlocking the switching control signal from the tri-state to turn on the high-side power switch and turn off the low-side power switch.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
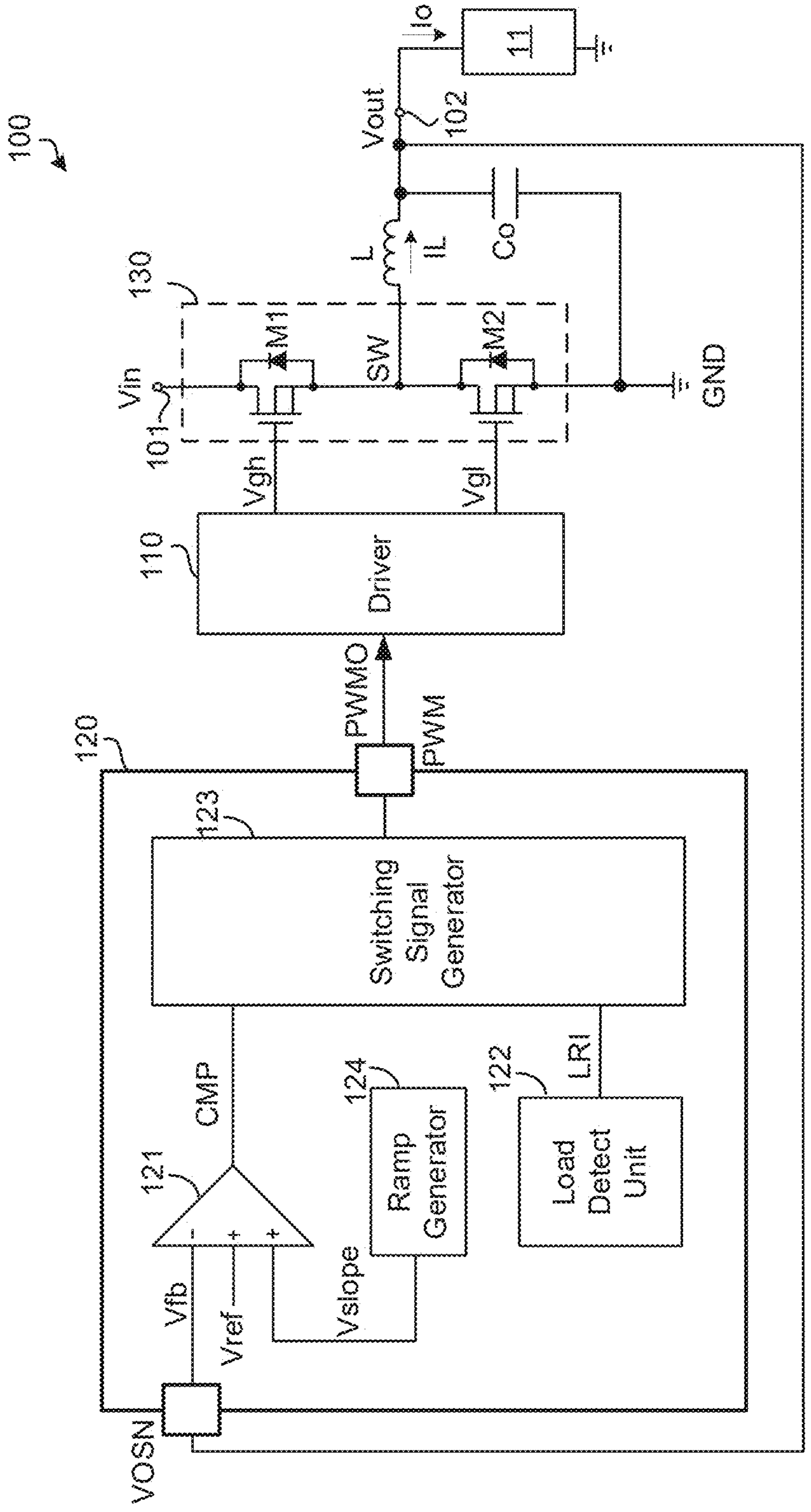
FIG. 1 schematically illustrates a switching converter 100 in accordance with an embodiment of the present invention.

FIG. 1 schematically illustrates a switching converter 100 in accordance with an embodiment of the present invention. In the example of FIG. 1, the switching converter 100 is a buck DC-DC converter. As can be appreciated, embodiments of the present invention are equally applicable to other types of switching converters, such as boost converter, buck-boost converter and so on. The switching converter 100 has an input node 101 to receive a DC input voltage Vin, and output node 102 to provide a regulated DC output voltage Vought and an output current Io to a load 11. The load 11 is external to the switching converter 100. The switching converter 100 further has a controller 120, a driver 110, and a switching circuit 130. In the example of FIG. 1, the switching converter 100 has one phase switching circuit. In other examples, the switching converter 100 may comprise two or more phases.

The switching circuit 130 has a high-side power switch M1 and a low-side power switch M2 coupled in series between the input node 101 and a reference ground GND. A switch node SW is formed by the high-side power switch M1 and the low-side power switch M2. The high-side power switch M1 and the low-side power switch M2 may comprise Bipolar Junction Transistor (BJT), Metal Oxide Semiconductor Field Effect Transistor (MOSFET), and other suitable transistors. In one embodiment, each of the high-side power switch M1 and the low-side power switch M2 has a first terminal (e.g., drain), a second terminal (e.g. source), and a control terminal (e.g., gate). The first terminal of the high-side power switch M1 is coupled to the input node 101, the second terminal of the high-side power switch M1 is coupled to the first terminal of the low-side power switch M2 to form the switch node SW, and the second terminal of the low-side power switch M2 is coupled to the reference ground GND. A magnetic device L is coupled between the switch node SW and the output node 102. A current IL flows through the magnetic device L. The magnetic device L may comprise an inductor or a transformer. In one embodiment, an output capacitor Co is coupled between the output node 102 and the reference ground GND.

The driver 110 is configured to drive the high-side power switch M1 and the low-side power switch M2 based on a switching control signal PWMO, e.g., in the form of a pulse width modulation signal. The driver 110 is configured to provide a drive signal Vgh to drive the high-side power switch M1 and provide a drive signal Vgl to drive the low-side power switch M2 based on the switching control signal PWMO. When in normal operation, the high-side power switch M1 and the low side power switch M2 are turned on alternately. For example, the low-side power switch M2 is OFF while the high-side power switch M1 is ON, and the high-side power switch M1 is OFF while the low-side power switch M2 is ON. When the high-side power switch M1 is ON and the low-side power switch M2 is OFF, the switching circuit 130 is turned ON, and the switch node SW electrically connects to the input node 101 via the high-side power switch M1. When the low-side power switch M2 is ON and the high-side power switch M1 is OFF, the switching circuit 130 is turned OFF, and the switch node SW electrically connects to the reference ground GND via the low-side power switch M2.

The controller 120 is configured to control the operation of the switching circuit 130 via providing the switching control signal PWMO to the driver 110. In one embodiment, the controller 120 is implemented as an integrated circuit (IC) with a plurality of pins including an input pin VOSN and an output pin PWM. The input pin VOSN receives the output voltage Vout or a signal representative of the output voltage Vout. The output pin PWM outputs the switching control signal PWMO. In one example, the controller 120 is configured to judge a condition of the load 11 and provide the switching control signal PWMO based on the output voltage Vout and the condition of the load 11. The condition of the load 11 may comprise steady state and a load release event. The load release event is an event when the output current Io drawn by the load 11 rapidly decreases from steady state. In one embodiment, in response to no load release event is occurring in the load 11, the controller 120 is configured to provide the switching control signal PWMO with a first state (e.g., logical HIGH) or a second state (e.g., logical LOW) based on the output voltage Vout. The first state of the switching control signal PWMO turns on the high-side power switch M1 and turns off the low-side power switch M2, while the second state of the switching control signal PWMO turns on the low-side power switch M2 and turns off the high-side power switch M1. In one embodiment, in response to the load release event being occurring, the controller 120 is configured to lock the switching control signal PWMO at a third state (e.g., tri-state) to force both the high-side power switch M1 and the low-side power switch M2 OFF, and the controller 120 is configured to unlock the switching control signal PWMO from the third state to the first state based on the output voltage Vout, e.g., when the output voltage Vout drops to a predetermined level. In some examples, a voltage level between a high threshold voltage (e.g. 2V) and the voltage source VCC (e.g. 3.3V) is considered as logical HIGH, a voltage level between zero voltage (0V) and a low threshold voltage (e.g. 1V) is considered as logical LOW, and a voltage level between the high threshold voltage and low threshold voltage is considered as the tri-state.

The controller 120 has a load detect unit 122 for detecting whether the load release event is occurring and providing a load indicate signal LRI to indicate the load conditions accordingly. The controller 120 asserts the load indicate signal LRI (e.g., logical HIGH) in response to the load release event being occurring. The controller 120 otherwise de-asserts the load indicate signal LRI (e.g., logical LOW) in response to no load release event being occurring.

In the example of FIG. 1, the controller 120 further has a comparison circuit 121 and a switching signal generator 123. The comparison circuit 121 is configured to provide a comparison signal CMP based on a feedback signal Vfb indicative of the output voltage out, a reference signal Very, and a slope signal Vslope. A feedback circuit (not shown in FIG. 1 for clarity) may be coupled to the input pin VOSN to provide the feedback signal Vfb based on the output voltage out. A ramp generator 124 provides the slope signal Vslope. The switching signal generator 123 is configured to provide the switching control signal PWMO based on the comparison signal CMP and the load indicate signal LRI.

Figure 2:
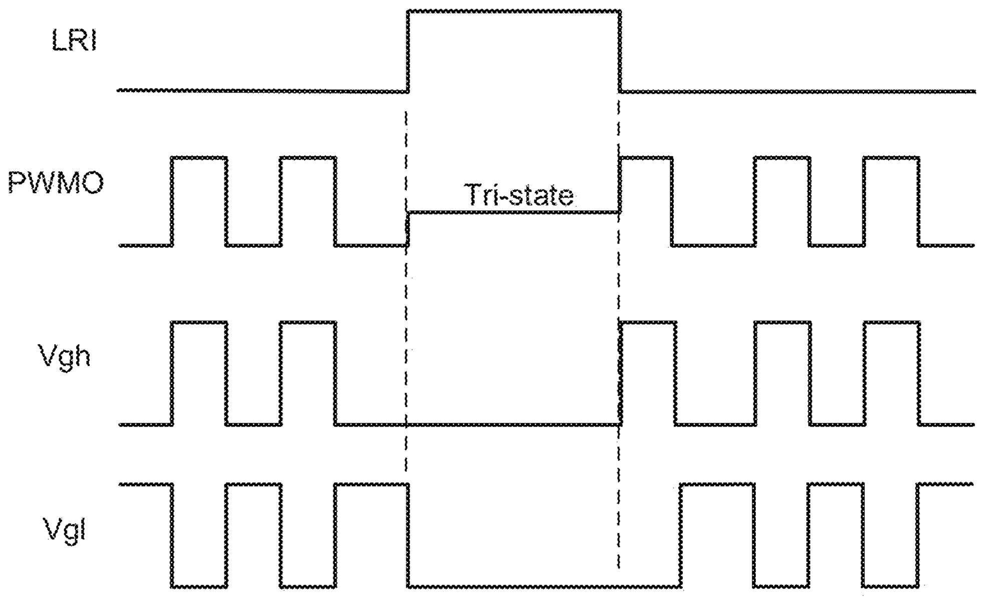
FIG. 2 illustrates an example timing diagram of the switching converter 100 of FIG. 1 in accordance with an embodiment of the present invention.

FIG. 2 illustrates an example timing diagram of the switching converter 100 of FIG. 1 in accordance with an embodiment of the present invention. The timing diagram of FIG. 2 shows the load indicate signal LRI, the switching control signal PWMO, the drive signal Vgh and the drive signal Vgl the from top to below. One with ordinary skill in the art should understand that the waveforms shown in FIG. 2 are under ideal conditions, disregarding ripples, spikes, and burrs.

As shown in FIG. 2, when the load release event is detected, the load indicate signal LRI becomes logical HIGH, the switching control signal PWMO transitions to the tri-state, to maintain the high-side power switch M1 OFF via the logical LOW drive signal Vah and turn OFF the low-side power switch M2 via the logical LOW drive signal Val, such that a body diode of the low-side power switch M2 is forced on to discharge the magnetic device L. In this manner, the current IL flowing through the magnetic device L may decrease with a larger slew rate to reduce overshoot of the output voltage Vo during the load release event.

Continuing with FIG. 2, in response to the falling edge of the load indicate signal LRI, it is detected that the load 11 recovering from the load release event to the steady state, the switching control signal PWMO transitions to logical HIGH from the tri-state, to turn ON the high-side power switch M1 via the logical HIGH drive signal Vah and maintain the low-side power switch M2 OFF via the logical LOW drive signal Val.

Figure 3:
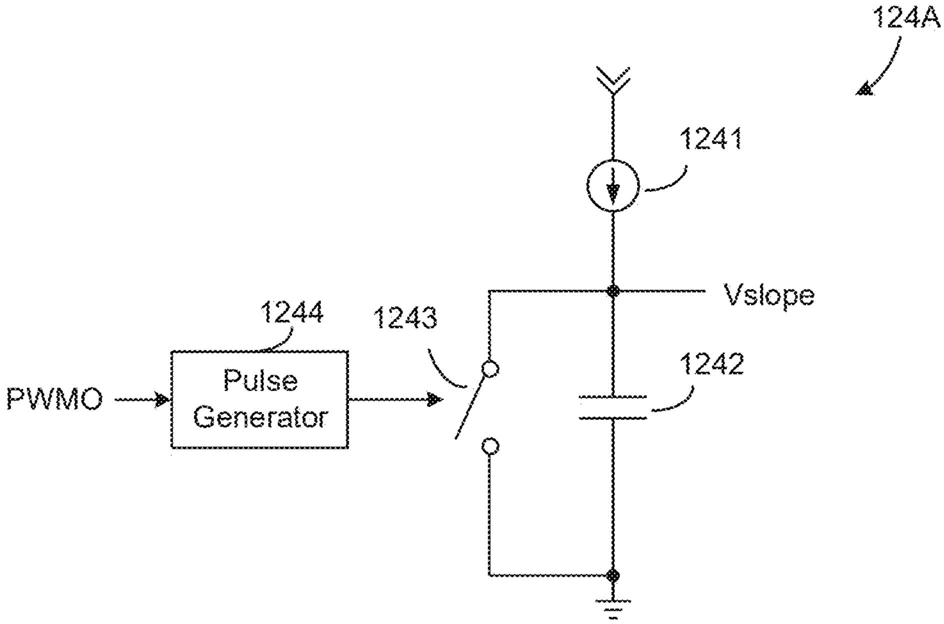
FIG. 3 schematically illustrates a ramp generator 124A in accordance with an embodiment of the present invention.

FIG. 3 schematically illustrates a ramp generator 124A in accordance with an embodiment of the present invention. The ramp generator 124A is a particular embodiment of the ramp generator 124 of FIG. 1. One with ordinary skill in the art should understand that the detailed circuit structure of the ramp generator 124 is not limited by the embodiment of FIG. 3.

As shown in FIG. 3, a current source 1241 is configured to charge a ramp capacitor 1242 to generate the slope signal Vslope when a ramp switch 1243 is turned off. The ramp capacitor 1242 is discharged to reset the slope signal Vslope to an initial value when the ramp switch 1243 is turned on. In one embodiment, the ramp switch 1243 is controlled based on the switching control signal PWMO via a pulse generator 1244. For example, when the switching control signal PWMO turns on the high-side power switch M1, the pulse generator 1244 is configured to turn on the ramp switch 1243 with a reset time period to reset the slope signal Vslope. After the reset time period, the pulse generator 1244 is configured to turn off the ramp switch 1243, and the ramp capacitor 1242 is charged by the current source 1241 again, as a reslult, the slope signal Vslope increases again. At least one of the current source 1241 and the ramp capacitor 1242, or both of the current source 1241 and the ramp capacitor 1242 could be adjusted to provide a desired slew rate of the slope signal Vslope.

Figure 4:
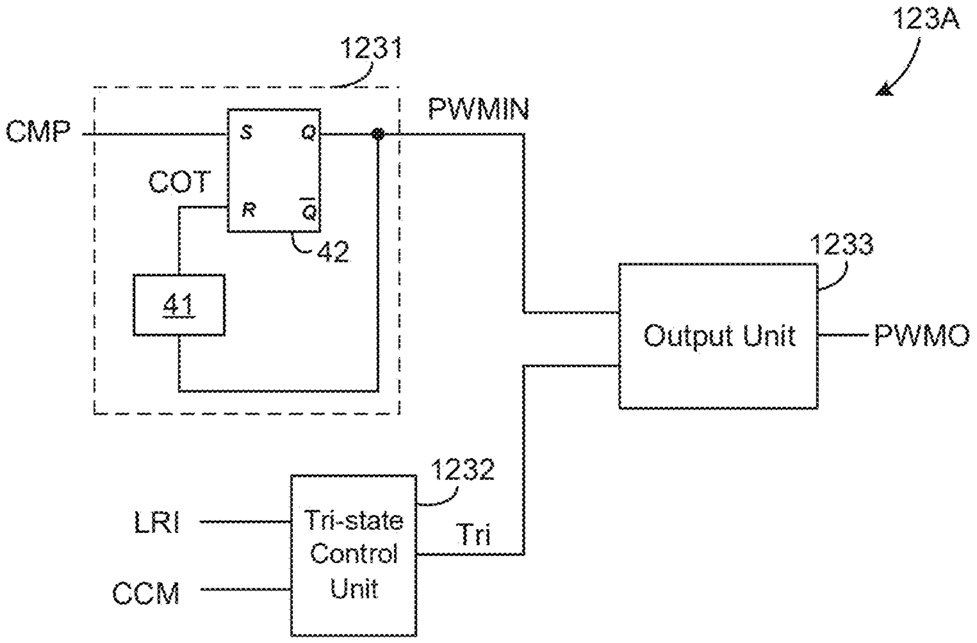
FIG. 4 schematically illustrates a switching signal generator 123A in accordance with an embodiment of the present invention.

FIG. 4 schematically illustrates a switching signal generator 123A in accordance with an embodiment of the present invention. The switching signal generator 123A is a particular embodiment of the switching signal generator 123 of FIG. 1. One with ordinary skill in the art should understand that the detailed circuit structure of the switching signal generator 123 is not limited by FIG. 4. In the example of FIG. 4, the switching signal generator 123A employs a constant ON-time control scheme as an example. As can be appreciated, embodiments of the present invention are equally applicable to other types of control scheme, such as constant OFF-time control, hysteresis control, peak current mode control, and so on.

As shown in FIG. 4, an ON-time control unit 1231 is configured to provide a pulse width modulation signal PWMIN based on the comparison signal CMP. A flip-flop 42 is set based on the comparison signal CMP, and the pulse width modulation signal PWMIN transitions to logical HIGH. The flip-flop 42 is reset by an ON-time control signal COT, and the pulse width modulation signal PWMIN transitions to logical LOW. An ON-time control circuit 41 is configured to provide the ON-time control signal COT to control an ON-time period TON of the high-side power switch M1 based on the pulse width modulation signal PWMIN. A tri-state control unit 1232 receives the load indicate signal LRI and generates a tri-state control signal Tri based on the load indicate signal LRI. In one embodiment, when the switching converter 100 operates in a continuous current mode (e.g., a mode signal CCM is logical HIGH to indicate that the current IL is always continuous in one switching period), the tri-state control unit 1232 is enabled to provide a tri-state control signal Tri based on the load indicate signal LRI, and an output unit 1233 is configured to provide the switching control signal PWMO based on the pulse width modulation signal PWMIN and the load indicate signal LRI. Otherwise when the switching converter 100 operates in discontinuous current mode (e.g., the mode signal CCM is logical LOW to indicate that the current IL is not always continuous in one switching period), the tri-state control unit 1232 is disabled, and the output unit 1233 is configured to provide the switching control signal PWMO based on the pulse width modulation signal PWMIN, regardless of the load indicate signal LRI. That is when the switching converter 100 operates in a continuous current mode, the switching control signal PWMO is provided based on the pulse width modulation signal PWMIN and the load release event, and when the switching converter 100 operates in a discontinuous current mode, the switching control signal PWMO is provided based on the pulse width modulation signal PWMIN regardless the load release event.

Figure 5:
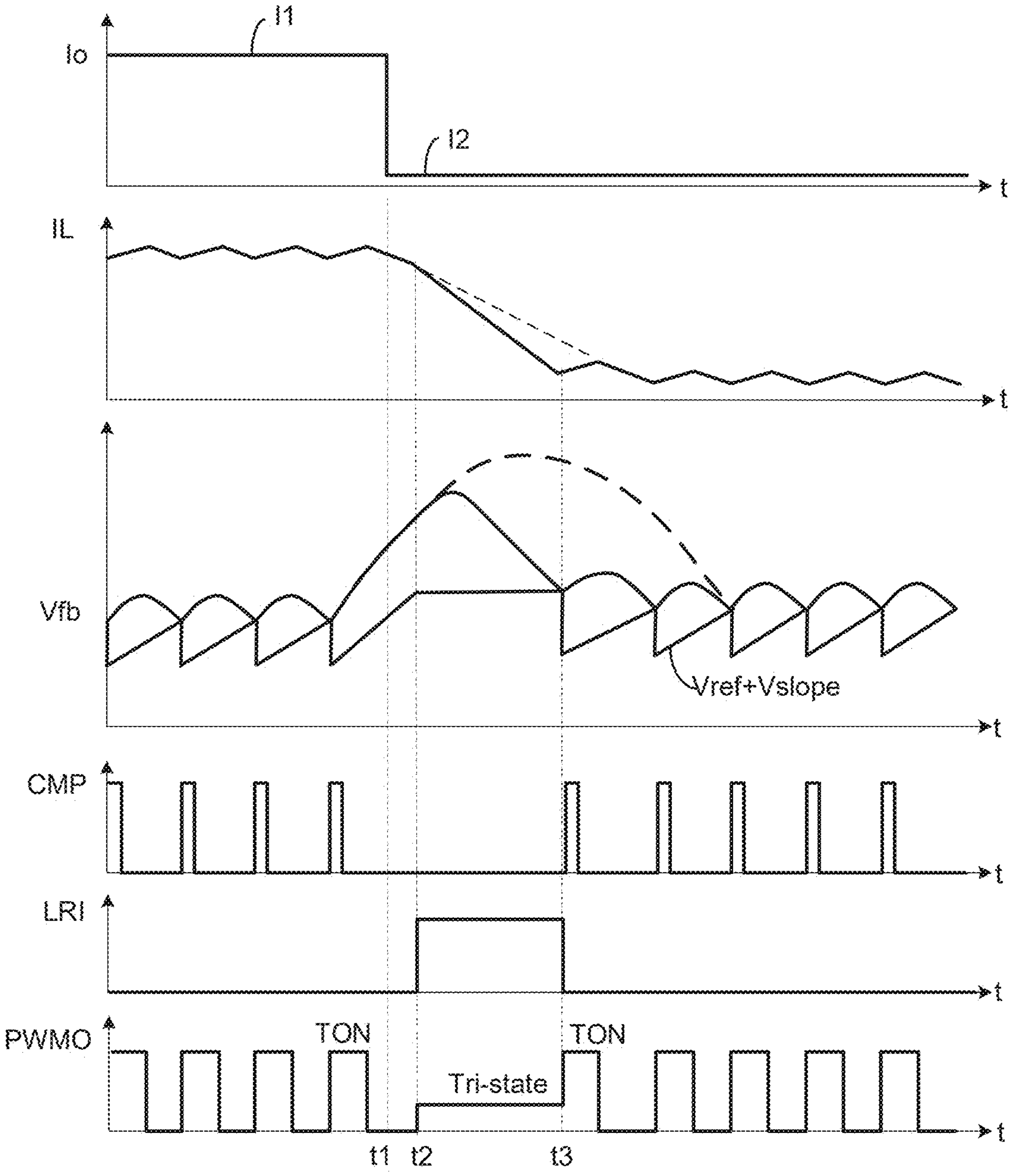
FIG. 5 illustrates another example timing diagram of the switching converter 100 of FIG. 1 with the load release event in accordance with an embodiment of the present invention.

FIG. 5 illustrates another example timing diagram of the switching converter 100 of FIG. 1 with the load release event in accordance with an embodiment of the present invention. The timing diagram of FIG. 5 shows the output current Io, the current IL, the feedback signal Vfb, the comparison signal CMP, the load indicate signal LRI, the switching control signal PWMO, the drive signal Vgh and the drive signal Vgl from top to below. The current IL and the feedback signal Vfb of a traditional switching converter are shown as dashed lines. One with ordinary skill in the art should understand that the waveforms shown in FIG. 5 are under ideal conditions, disregarding ripples, spikes, and burrs.

In one embodiment, if the load indicate signal LRI indicates that no load release event is occurring in the load 11, as well as the feedback signal Vfb is lower than a sum of the reference signal Vref and the slope signal Vslope, the switching control signal PWMO transitions to the first state (e.g., logical HIGH) to turn on the high-side power switch M1 and turn off the low-side power switch M2, and until the ON-time period TON expires, the switching control signal PWMO transitions to the second state (e.g., logical LOW) to turn off the high-side power switch M1 and turn-on the low-side power switch M2. In one embodiment, if the load indicate signal LRI indicates that the load release event is occurring in the load 11, as well as the feedback signal Vfb is higher than the sum of the reference signal Vref and the slope signal Vslope, the switching control signal PWMO is locked in the tri-state to force the high-side power switch M1 and the low-side power switch M2 OFF, such that a body diode of the low-side power switch M2 is forced ON to discharge the magnetic device L, until the feedback signal Vfb is lower than the sum of the reference signal Vref and the slope signal Vslope, the load indicate signal LRI returns to logical LOW, the switching control signal PWMO is unlocked from the tri-state to the first state to turn on the high-side power switch M1 and maintain the low-side power switch M2 OFF for the ON-time period TON.

As shown in FIG. 5, when the feedback signal Vfb is lower than a sum of the reference signal Very and the slope signal Vslope, the comparison signal CMP becomes logical HIGH. At time t1, the output current Io decreases from I1 (e.g., 10 A) to I2 (e.g., 1 A) instantly, then the current IL decreases slowly such that the energy stored in the inductor transferring to the output capacitor Co, which will increase the output voltage out. The feedback signal Vfb increases and remains higher than the sum of the reference signal Very and the slope signal Vslope. At time t2, the load indicate signal LRI becomes logical HIGH to indicate that the load release event is occurring, the switching control signal PWMO is locked to the tri-state to maintain the high-side power switch M1 and the low-side power switch M2 OFF. Such that a body diode of the low-side power switch M2 is forced ON to fast discharge the magnetic device L, and the magnetic device L decreases steeper than the traditional current IL. Until the feedback signal Vfb is lower than the sum of the reference signal Vref and the slope signal Vslope again at time t3, the load 11 is deteced as recovering from the load release event to the steady state, the load indicate signal LRI becomes logical LOW, the switching control signal PWMO is unlocked from the tri-state to the logical HIGH, such that the high-side power switch M1 is turned ON and the low-side power switch M2 maintains OFF. Embodiments of present invention help to reduce overshoot of the output voltage out by discharging the magnetic device L faster in response to the load release event is occurring. Moreover, the overshoot reduction can save more output capacitors and save printed circuit board (PCB) size.

Continuing with FIG. 5, before time t2, the load indicate signal LRI is logical LOW to indicate that no load release event is occurring, the controller 120 is configured to turn on and turn off the high-side power switch M1 and the low-side power switch M2 alternately based on the feedback signal Vfb. For example, once the the feedbak signal Vfb is less than the sum of the reference signal Vref and the slope signal Vslope, the comparison signal CMP becomes logical HIGH, the switching control signal PWMO becomes logical HIGH to turn ON the high-side power switch M1 and turn OFF the low-side power switch M2. Until the ON-time period TON expires, the switching control signal PWMO becomes logical LOW to turn OFF the high-side power switch M1 and turn ON the low-side power switch M2.

Figure 6:
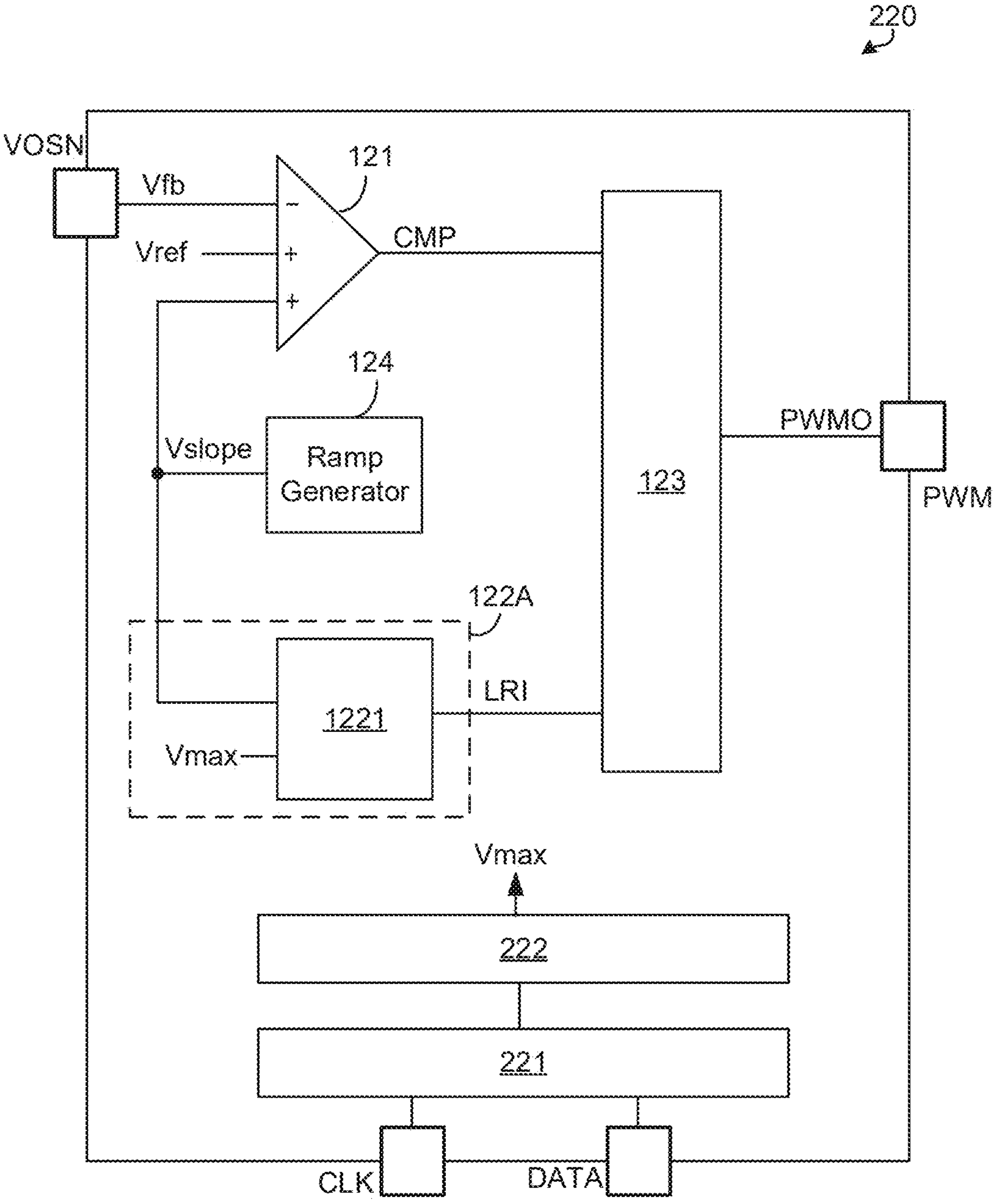
FIG. 6 schematically illustrates a controller 220 in accordance with an embodiment of the present invention.

FIG. 6 schematically illustrates a controller 220 in accordance with an embodiment of the present invention. The controller 220 is a particular embodiment of the controller 120. As shown in FIG. 6, a load detect unit 122A is configured to provide the load indicate signal LRI based on the slope signal Vslope. In one embodiment, the load detect unit 122A has a slope clamping detect unit 1221 to determine whether the slope signal Vslope is clamped at a voltage level Vmax. The load detect unit 122A is configured to provide the load indicate signal LRI to indicate that the load release event is occurring in response to the slope clamping detection unit 1221 determining that the slope signal Vslope is clamped at the voltage level Vmax.

As shown in FIG. 6, the controller 220 further comprises a communication interface 221 and a memory 222. The memory 222 is configured to control the voltage level Vmax based on data packets stored in the memory 222. The communication interface 221 is coupled to communication pins CLK and DATA to receive commands and data packets from a host and is configured to write the memory 222.

Figure 7:
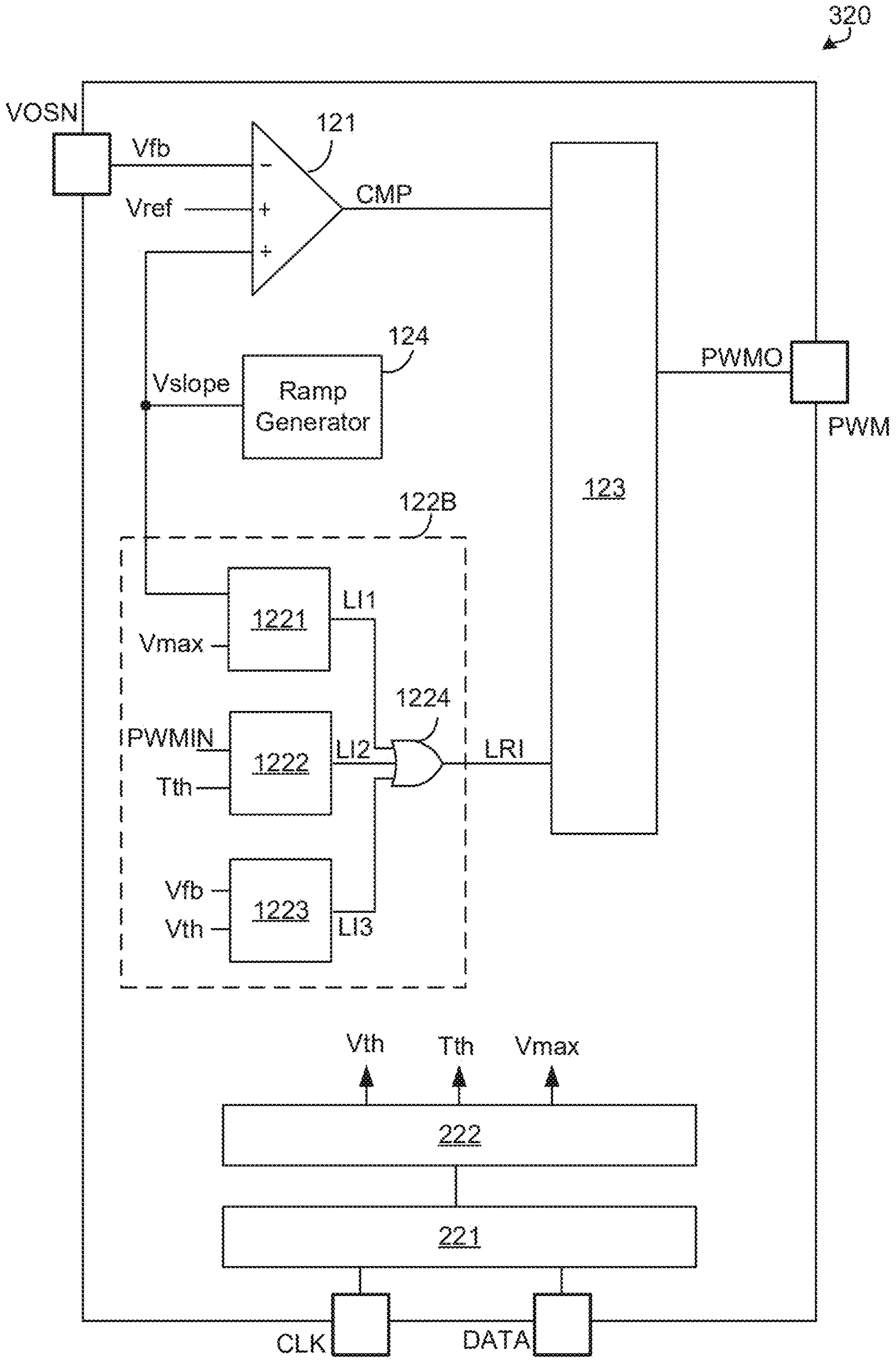
FIG. 7 schematically illustrates a controller 320 in accordance with an embodiment of the present invention.

FIG. 7 schematically illustrates a controller 320 in accordance with an embodiment of the present invention. The controller 320 is a particular embodiment of the controller 120. In the embodiment of FIG. 7, a load detect unit 122B is configured to provide the load indicate signal LRI based on the slope signal Vslope, the feedback signal Vfb, and a switching frequency fs of the switching control signal PWMO. The load indicate signal LRI indicates that the load release is occurring if any one of the feedback signal Vfb, the switching freqyency Fs or the slope signal Vslope satisfies a corresponding load release indicating condition.

In one embodiment, the load detect unit 122B has the slope clamping detect unit 1221, a low frequency detect unit 1222, and an overshoot detect unit 1223. The slope clamping detect unit 1221 is configured to provide a load indicate signal LI1 to indicate that the load release event is occurring in response to the slope clamping detection unit 1221 determining that the slope signal Vslope is clamped at the voltage level Vmax. The low frequency detect unit 1222 is configured to provide a load indicate signal LI2 to indicate that the load release is occurring in response to the low frequency detect unit 1222 determining that the switching frequency Fs is lower than a frequency threshold. In one embodiment, the low frequency detection unit 1222 is configured to detect whether a time period during which the pulse width modulation signal PWMIN at a logical LOW is longer than a steady state time period Tth. Once the time period during which the pulse width modulation signal PWMIN at a logical LOW is longer than the steady state time period Tth, the low frequency detect unit 1222 determines that the load release event is occurring. The steady state time period Tth represents a time period that the pulse width modulation signal PWMIN is at a logical LOW under the steady state load condition. The overshoot detect unit 1223 is configured to provide a load indicate signal LI3 to indicate that the load release event is occurring in response to the overshoot detect unit 1223 determining that the output voltage out is higher than steady state. In one embodiment, the overshoot detect unit 1223 is configured to detect whether the output voltage Vout is higher than steady state via comparing the feedback signal Vfb with an overshoot threshold Vth. Once the feedback signal Vfb is higher than the overshoot threshold Vth, the overshoot detect unit 1223 determines that the output voltage Vout is higher than steady state and the load release event is occurring. A logic cirucit 1224 is configured to provide the load indicate signal LRI to the switching signal generator 123 based on the load indicate signals LI1-LI3. In one embodiment, the logic circuit 1224 comprises an OR gate.

The embodiment of FIG. 7 provides three detect scheme to determine whether the load release event is occurring, and either one will trigger the controller 320 to force the switching control signal PWMO at the tri-state. The three detect scheme can cover comprehensive system scenario to make sure the load release event is detected in time. For example, once the output voltage out is higher than steady-state, the switching frequency fs is lower than steady state, or once the slope signal Vslope is clamped, it is determined that the load release event is occurring.

As shown in FIG. 7, The memory 222 is further configured to control the overshoot threshold Vth and the steady state time period Tth based on the data packets stored in the memory 222.

Figure 8:
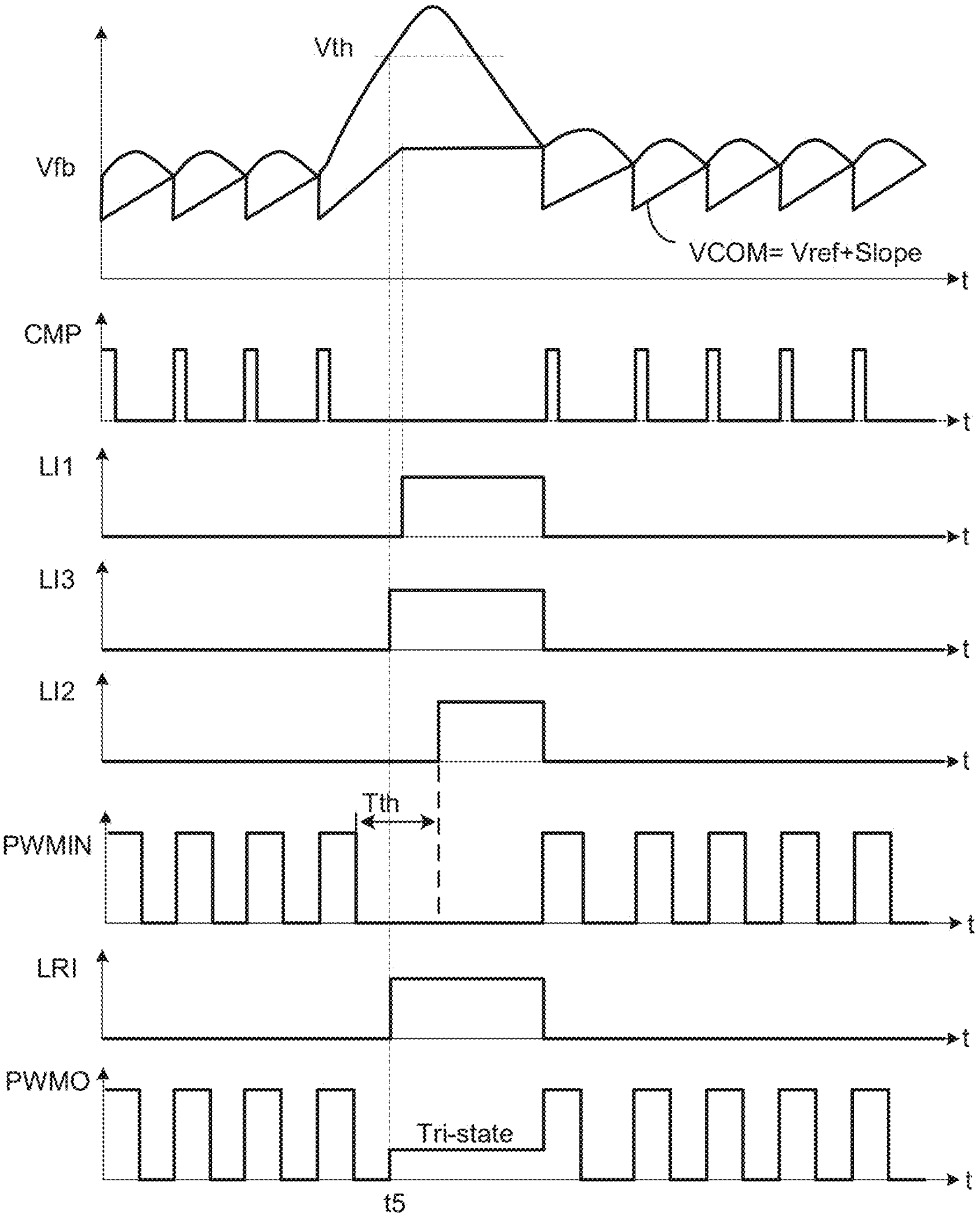
FIGS. 8-10 illustrate timing diagrams of the controller 320 shown in FIG. 7 in accordance with an embodiment of the present invention.
Figure 9:
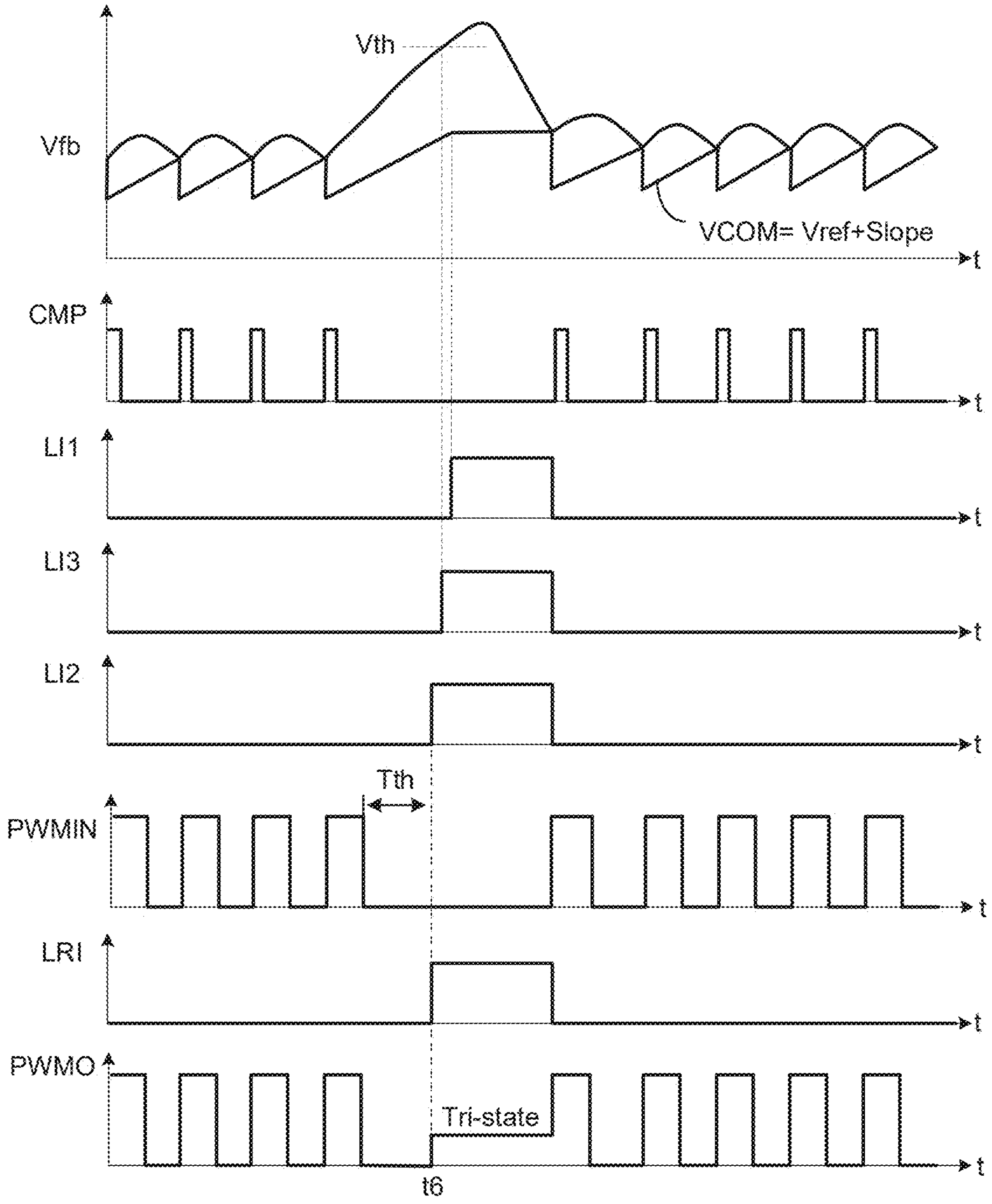
Figure 10:
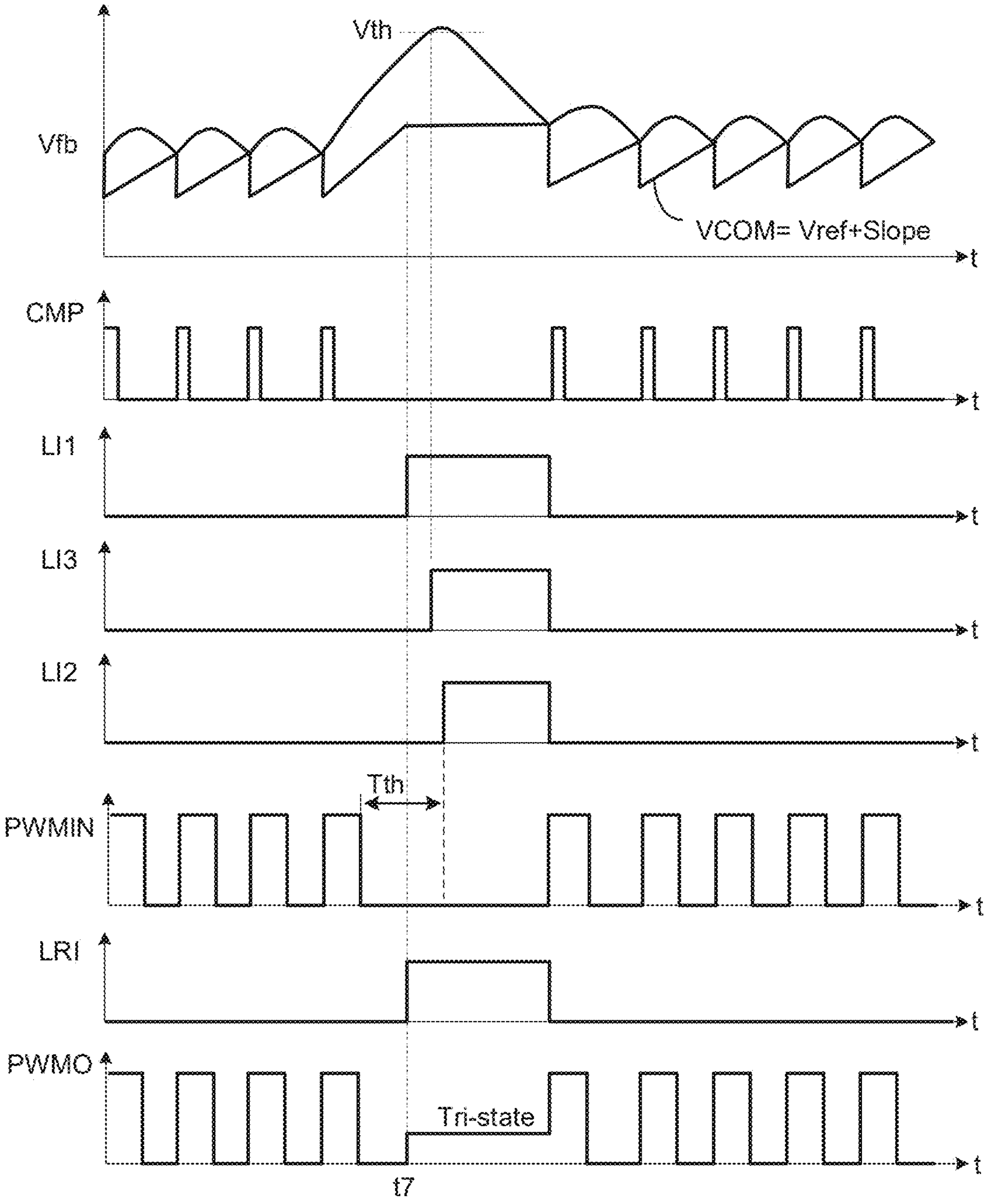

FIGS. 8-10 illustrate timing diagrams of the controller 320 shown in FIG. 7 in accordance with an embodiment of the present invention. FIG. 8 shows that the tri-state of the switching control signal PWMO is triggered by the feedback signal Vfb being higher than the overshoot threshold Vth. FIG. 9 shows that the tri-state of the switching control signal PWMO is triggered by the switching frequency fs being lower than the frequency threshold Ft (i.e., the time period during which the pulse width modulation signal PWMIN at a logical LOW is longer than the steady state time period Tth). FIG. 10 shows that the tri-state of the switching control signal PWMO is triggered by the clamped slope signal slope.

Figure 11:
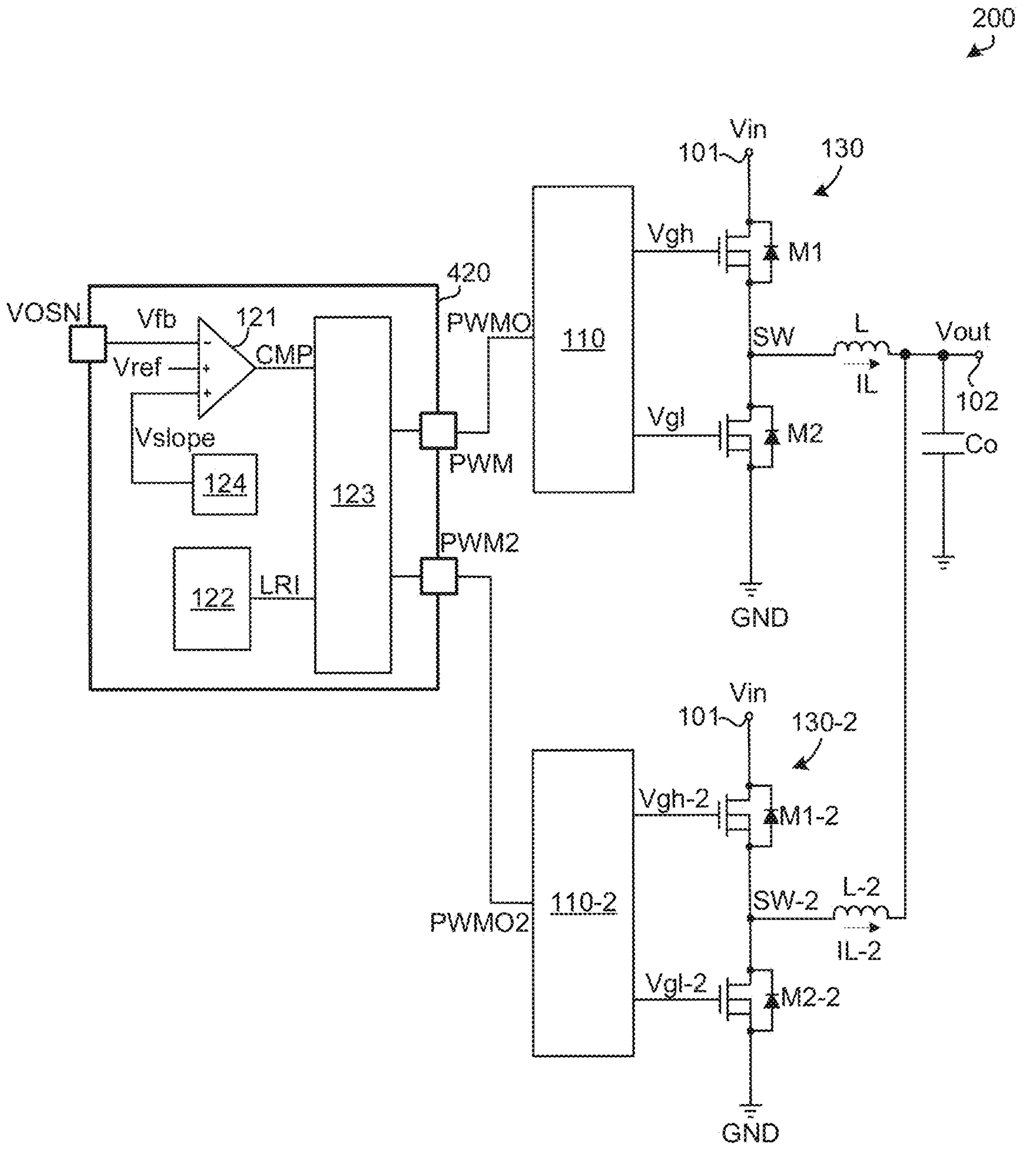
FIG. 11 schematically illustrates a switching converter 200 in accordance with an embodiment of the present invention.

FIG. 11 schematically illustrates a switching converter 200 in accordance with an embodiment of the present invention. In the example of FIG. 11, the switching converter 200 has two phases (e.g., the switching circuit 130 for a first phase, and a switching circuit 130-2 for a second phase). The switching converter 200 may have two or more phases not limited by FIG. 11. The switching circuit 130-2 is coupled in parallel with the switching circuit 130 as shown in FIG. 11 to receive the input voltage Vin and provide the output voltage out.

A controller 420 is configured to control the operation of the switching circuits 130 and 130-2 via drivers 110 and 110-2 respectively. In one embodiment, the controller 420 is implemented as an integrated circuit (IC) with a plurality of pins including the input pin VOSN, the output pin PWM configured to provide the switching control signal PWM, and an output pin PWM2 configured to provide the switching control signal PWMO2. The controller 420 is configured to judge the condition of the load 11 and provide the switching control signals PWMO and PWMO2 for controlling the corresponding switching circuits based on the output voltage Vought and the condition of the load 11. For example, the controller 420 provides the switching control signal PWMO to control the switching circuit 130 via the driver 110 and provides the switching control signal PWMO2 to control the switching circuit 130-2 via the driver 110-2.

In one embodiment, the controller 420 interleaves the switching control signals PWMO and PWMO2 to sequentially turn ON the switching circuits 130 and 130-2 one at a time in interleaved fashion to generate the regulated output voltage Vout. In yet another embodiment, the controller 420 turns ON both switching circuits 130 and 130-2 at the same time, for example but not limited to increasing output current Io drawn by the load 11. In one embodiment, when the controller 420 determines that the load release event is occurring, the controller 420 locks at least one of the switching control signals PWMO and PWMO2 at tri-state. In another embodiment, when the controller 420 determines that the load release event is occurring, the controller 420 locks both of the switching control signals PWMO and PWMO2 at tri-state.

Figure 12:
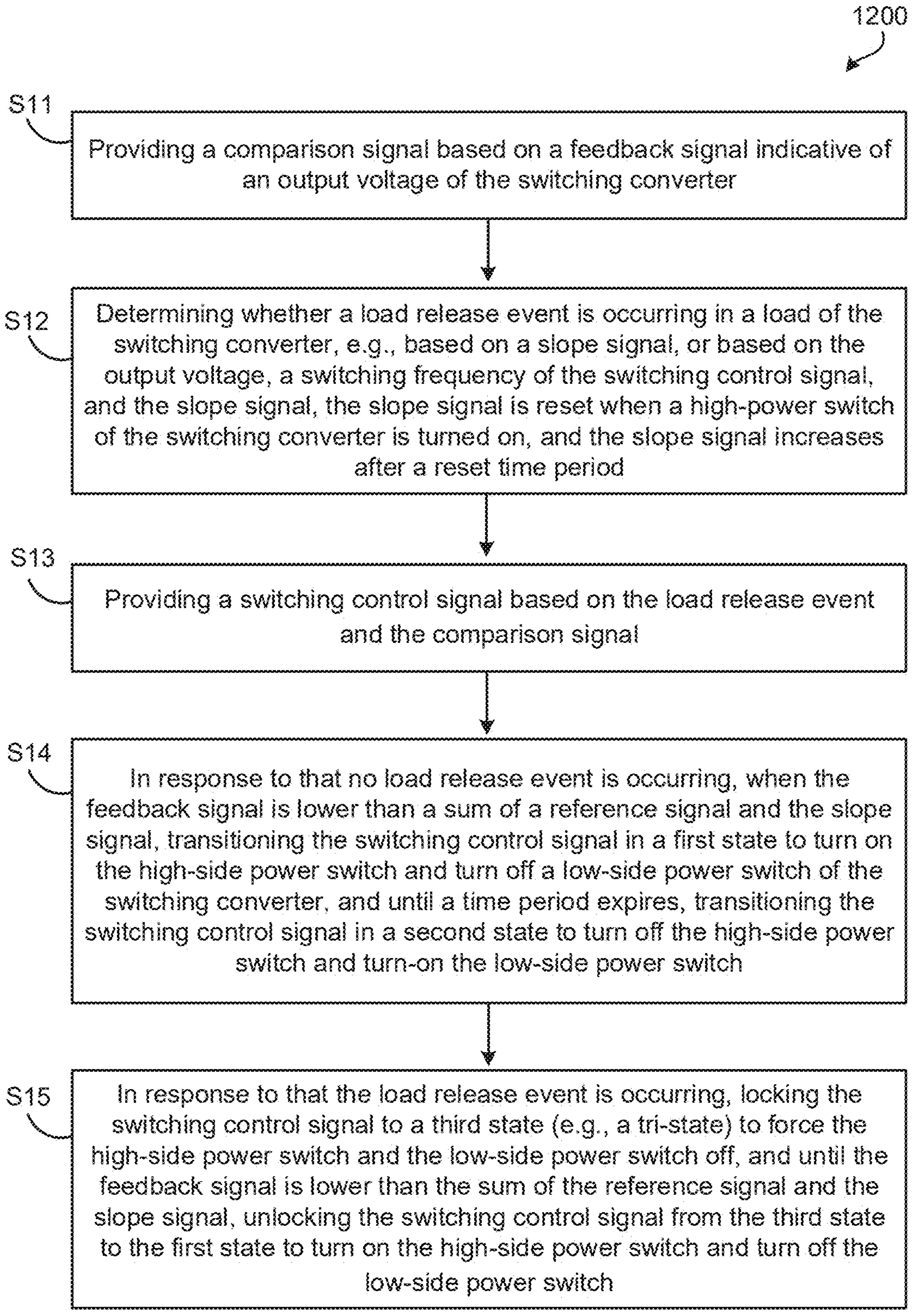
FIG. 12 illustrates a control method for a switching converter in accordance with an embodiment of the present invention.

FIG. 12 illustrates a control method 1200 for a switching converter in accordance with an embodiment of the present invention. The control method 1200 comprises steps S11-S15.

At step S11, providing a comparison signal based on a feedback signal indicative of an output voltage of the switching converter.

At step S12, determining whether a load release event is occurring in a load of the switching converter. For example, based on a slope signal, or based on the output voltage, a switching frequency of the switching control signal, and the slope signal. The slope signal is reset when a high-side power switch of the switching converter is turned on, and the slope signal increases after a reset time period.

In one example, it is determined that the load release event is occurring when the slope signal is clamped at a voltage level. In another example, it is determined that the load release is occurring if any one of the output voltage, the switching frequency of the switching control signal, or the slope signal satisfies a corresponding load release indicating condition. For example, once the output voltage is higher than an overshoot threshold, the load release indicating condition is satisfied, it is determined that the load release event is occuring. Once the switching frequency of the switching control signal is lower than a load release threshold, the load release indicating condition is satisfied it is determined that the load release event is occurring. Once the slope signal is clamped at the voltage level, the load release indicating condition is satisfied, it is determined that the load release event is occurring.

At step S13, providing a switching control signal based on the load release event and the comparison signal.

At step S14, in response to that no load release event is occurring, when the feedback signal is lower than a sum of a reference signal and the slope signal, transitioning the switching control signal in a first state to turn on the high-side power switch and turn off a low-side power switch of the switching converter, and until a time period expires, transitioning the switching control signal in a second state to turn off the high-side power switch and turn-on the low-side power switch.

At step S15, in response to that the load release event is occurring, locking the switching control signal to a third state. e.g., a tri-state, to force the high-side power switch and the low-side power switch off, and until the feedback signal is lower than the sum of the reference signal and the slope signal, unlocking the switching control signal from the third state to turn on the high-side power switch and turn off the low-side power switch.

Note that in the flow chart described above, the box functions may also be implemented with different order as shown in FIG. 12. Two successive box functions may be executed meanwhile, or sometimes the box functions may be executed in a reverse order.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A controller for a switching converter, comprising:

a comparison circuit configured to provide a comparison signal based on a feedback signal indicative of an output voltage of the switching converter, a reference signal and a slope signal;

a load detect unit configured to determine whether a load release event is occurring in a load of the switching converter;

a switching signal generator configured to provide a switching control signal based on the comparison signal and the load release event; and a slope generator coupled to the comparison circuit to provide the slope signal; wherein in response to the load detect unit determines that no load release event is occurring, when the feedback signal is lower than a sum of the reference signal and the slope signal, the switching control signal transitions to a first state to turn on a high-side power switch of the switching converter and turn off a low-side power switch of the switching converter, and until an ON-time period expires, the switching control signal transitions to a second state to turn off the high-side power switch and turn-on the low-side power switch;

in response to the load detect unit determines that the load release event is occurring, the switching control signal is locked in a third state to force the high-side power switch and the low-side power switch off, and to force a body diode of the low-side power switch on, and until the feedback signal is lower than the sum of the reference signal and the slope signal, the switching control signal is unlocked from the third state to the first state; and wherein in the third state, a voltage level of the switching control signal is distinct from those of the first and second states of the switching control signal.

2. The controller of claim 1, wherein the load detect unit is configured to determine whether the load release event is occurring based on the slope signal, wherein the slope signal is reset during a reset time period when the high-power switch is turned on, and the slope signal increases after the reset time period.

3. The controller of claim 2, wherein the load detect unit determines that the load release event is occurring when the slope signal is clamped at a maximum voltage level.

4. The controller of claim 1, wherein the load detect unit is further configured to determine whether the load release event is occurring based on the output voltage, a switching frequency of the switching control signal, and the slope signal, and the load detect unit is configured to determine that the load release is occurring if any one of the output voltage, the switching frequency of the switching control signal, or the slope signal satisfies a corresponding load release indicating condition.

5. The controller of claim 4, wherein once the output voltage is higher than an overshoot threshold, the load release indicating condition is satisfied, and the load detect unit is configured to determine that the load release event is occurring.

6. The controller of claim 4, wherein once the switching frequency of the switching control signal is lower than a load release threshold, the load release indicating condition is satisfied, and the load detect unit is configured to determine that the load release event is occurring.

7. The controller of claim 4, wherein once the slope signal is clamped at a maximum voltage level, the load release indicating condition is satisfied, and the load detect unit is configured to determine that the load release event is occurring.

8. A switching converter, comprising:

an input node configured to receive an input voltage;

an output node configured to provide an output voltage to a load;

a switching circuit comprising a high-side power switch and a low-side power switch, wherein the high-side power switch and the low-side power switch are coupled in series between the input node and a reference ground, and a switch node is formed by the high-side power switch and the low-side power switch;

a magnetic device coupled between the switch node and the output node;

a driver configured to drive the high-side power switch and the low-side power switch based on a switching control signal; and a controller coupled to the driver to provide the switching control signal based on a load release event and a feedback signal indicative of the output voltage; wherein in response to the controller determines that no load release event is occurring, when the feedback signal is lower than a sum of a reference signal and a slope signal, the switching control signal transitions to a first state to turn on the high-side power switch of the switching converter and turn off the low-side power switch of the switching converter, and until an ON-time period expires, the switching control signal transitions to a second state to turn off the high-side power switch and turn-on the low-side power switch;

in response to the controller determines that the load release event is occurring, the switching control signal is locked in a tri-state to force the high-side power switch and the low-side power switch off, and to force a body diode of the low-side power switch on, and until the feedback signal is lower than the sum of the reference signal and the slope signal, the switching control signal is unlocked from the tri-state to turn on the high-side power switch and turn off the low-side power switch; and wherein in the tri-state, a voltage level of the switching control signal is distinct from those of the first and second states of the switching control signal.

9. The switching converter of claim 8, wherein the controller further comprises:

a load detect unit configured to determine whether the load release event is occurring based on the slope signal, wherein the slope signal is reset during a reset time period when the high-power switch is turned on, and the slope signal increases after the reset time period.

10. The switching converter of claim 9, wherein the load detect unit determines that the load release event is occurring when the slope signal is clamped at a maximum voltage level.

11. The switching converter of claim 8, wherein the controller further comprises:

a load detect unit configured to determine whether the load release event is occurring based on the output voltage, a switching frequency of the switching control signal, and the slope signal, and the the load detect unit is configured to determine that the load release is occurring if any one of the output voltage, the switching frequency of the switching control signal, or the slope signal satisfies a corresponding load release indicating condition.

12. The switching converter of claim 11, wherein once the output voltage is higher than an overshoot threshold, the load release indicating condition is satisfied, and the load detect unit is configured to determine that the load release event is occurring.

13. The switching converter of claim 11, wherein once the switching frequency of the switching control signal is lower than a load release threshold, the load release indicating condition is satisfied, and the load detect unit is configured to determine that the load release event is occurring.

14. The switching converter of claim 11, wherein once the slope signal is clamped at a maximum voltage level, the load release indicating condition is satisfied, and the load detect unit is configured to determine that the load release event is occurring.

15. A control method for a switching converter, comprising:

providing a comparison signal based on a feedback signal indicative of an output voltage of the switching converter;

determining whether a load release event is occurring in a load of the switching converter; and providing a switching control signal based on the load release event and the comparison signal; wherein in response to that no load release event is occurring, when the feedback signal is lower than a sum of a reference signal and a slope signal, transitioning the switching control signal in a first state to turn on a high-side power switch of the switching converter and turn off a low-side power switch of the switching converter, and until an ON-time period expires, transitioning the switching control signal in a second state to turn off the high-side power switch and turn-on the low-side power switch;

in response to that the load release event is occurring, locking the switching control signal to a tri-state to force the high-side power switch and the low-side power switch of the switching converter off, and to force a body diode of the low-side power switch on, and until the feedback signal is lower than the sum of the reference signal and the slope signal, unlocking the switching control signal from the tri-state to turn on the high-side power switch and turn off the low-side power switch; and wherein in the tri-state, a voltage level of the switching control signal is distinct from those of the first and second states of the switching control signal.

16. The control method of claim 15, further comprising: determining whether the load release event is occurring based on the slope signal, wherein the slope signal is reset when the high-power switch is turned on, and the slope signal increases after a reset time period.

17. The control method of claim 16, wherein when the slope signal is clamped at a maximum voltage level, it is determined that the load release event is occurring.

18. The control method of claim 15, further comprising: determining whether the load release event is occurring based on the output voltage, a switching frequency of the switching control signal, and the slope signal, and it is determined that the load release is occurring if any one of the output voltage, the switching frequency of the switching control signal, or the slope signal satisfies a corresponding load release indicating condition.

19. The control method of claim 18, wherein once the output voltage is higher than an overshoot threshold, the load release indicating condition is satisfied, it is determined that the load release event is occurring.

20. The control method of claim 18, wherein once the switching frequency of the switching control signal is lower than a load release threshold, the load release indicating condition is satisfied, it is determined that the load release event is occurring.

21. The control method of claim 18, wherein once the slope signal is clamped at a maximum voltage level, the load release indicating condition is satisfied, it is determined that the load release event is occurring.

* * * * *